United States Patent
Levy

(10) Patent No.: US 11,187,373 B2
(45) Date of Patent: Nov. 30, 2021

(54) TELEVISION MOUNTING BRACKETS

(71) Applicant: Paragon Group USA LLC, Englewood, NJ (US)

(72) Inventor: Shlomo Levy, Rishon LeZion (IL)

( * ) Notice: Subject to any disclaimer, the term of this patent is extended or adjusted under 35 U.S.C. 154(b) by 123 days.

(21) Appl. No.: 16/792,906

(22) Filed: Feb. 18, 2020

(65) Prior Publication Data

US 2021/0254784 A1     Aug. 19, 2021

(51) Int. Cl.
  *F16M 13/02*    (2006.01)
  *H04N 5/655*    (2006.01)
  *F16M 11/16*    (2006.01)

(52) U.S. Cl.
  CPC ............ *F16M 13/02* (2013.01); *H04N 5/655* (2013.01); *F16M 11/16* (2013.01)

(58) Field of Classification Search
  CPC ......... F16M 13/02; F16M 11/16; H04N 5/655
  See application file for complete search history.

(56) References Cited

U.S. PATENT DOCUMENTS

| | | | | |
|---|---|---|---|---|
| 5,850,996 A * | 12/1998 | Liang | ...................... | H04M 1/04 248/221.11 |
| 8,077,449 B2 * | 12/2011 | Mi | ......................... | F16M 11/24 361/679.21 |
| 8,919,623 B1 * | 12/2014 | Bergeron | ................. | A45F 5/021 224/148.4 |
| 9,072,364 B2 * | 7/2015 | Johnson | ............... | F16M 13/027 |
| 10,400,949 B1 * | 9/2019 | Kozak | .................... | F16M 13/02 |
| 10,631,670 B1 * | 4/2020 | Lo | ............................ | F16B 45/02 |
| 2021/0078033 A1 * | 3/2021 | Deegan | ................ | A46B 5/0058 |

* cited by examiner

*Primary Examiner* — Anita M King

(57) ABSTRACT

A television mounting bracket for hanging a television on a wall that include a first body that is designed to be connected to the wall and a second body that is designed to be connected to the television. The first body has a vertical c-profile channel that has a top opening and a vertical slot. The bottom part of the c-profile channel is narrower than the rest of it. The first body has a horizontal springy pin that is connected to its back part with a spring and protrudes from it into the c-profile channel in a way that enable the springy pin to move backward and forward. The second body has a horizontal pin with a locking piece that includes a vertical channel. The locking piece corresponds with the vertical slot and the vertical channel corresponds with the horizontal springy pin.

1 Claim, 15 Drawing Sheets

TELEVISION MOUNTING BRACKETS

TECHNICAL FIELD

The present invention refers to television mounting brackets (100) for hanging a television on a wall.

BACKGROUND ART

There are many types of TV brackets that include two parts: one part to be connected to the TV and the other one to be connected to the wall, then combine the two parts by sliding one part into the other. In many cases, members of the house or guests rise up and accidentally push the TV upwards that comes out of the brackets and falls to the floor or on the household members. The present invention provides an effective solution to this problem.

DESCRIPTION OF THE DRAWINGS

The intention of the drawing attached to the application is not to limit the scope of the invention and its application. The drawing is intended only to illustrate the invention and it constitutes only one of its many possible implementations.

THE INVENTION

Figure 1:
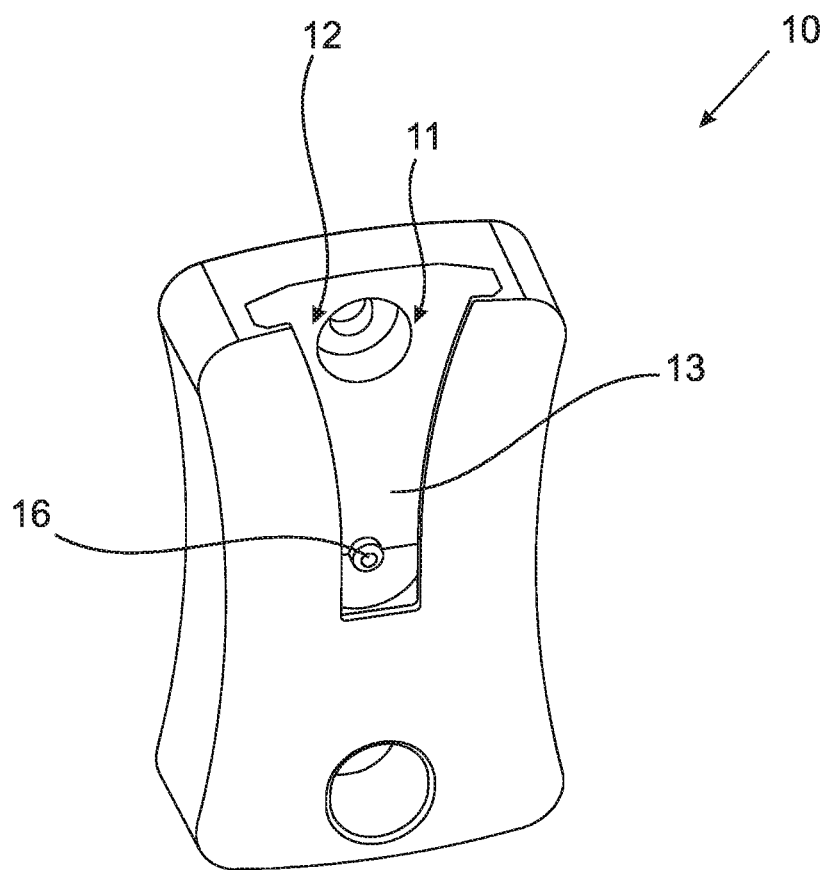
FIG. 1 depicts the first body (10) and its elements.

The main objective of the present invention is to provide a television mounting bracket (100) for hanging a television on a wall. The television mounting bracket (100) includes a first body (10) that is designed to be connected to the wall and a second body (20) that is designed to be connected to the television.

The first body (10) has a vertical channel in the profile of the letter C (11) (hereinafter and in the claims "a vertical c-profile channel") that has a top opening (12) and a vertical slot (13). The bottom part (14) of the vertical c-profile channel is narrower than the rest of the vertical c-profile channel (15). The first body (10) has also a horizontal springy pin (16) that protrudes from the back part (17) of the first body itself into the vertical c-profile channel. The springy pin (16) is connected to the back part of the first body with a spring (161) in a way that it is possible to repel the springy pin backward and it returns to its place by the force of the spring. The first body (10) may also include holes and screws for connecting it to the wall.

The second body (20) has a horizontal pin (21) that is ended with a locking piece (22) that includes a vertical channel (23). The locking piece (22) corresponds with the vertical slot (13) and the vertical channel (23) corresponds with the horizontal springy pin (16). The second body (20) may also include holes and screws for connecting it to the television.

Figure 2:
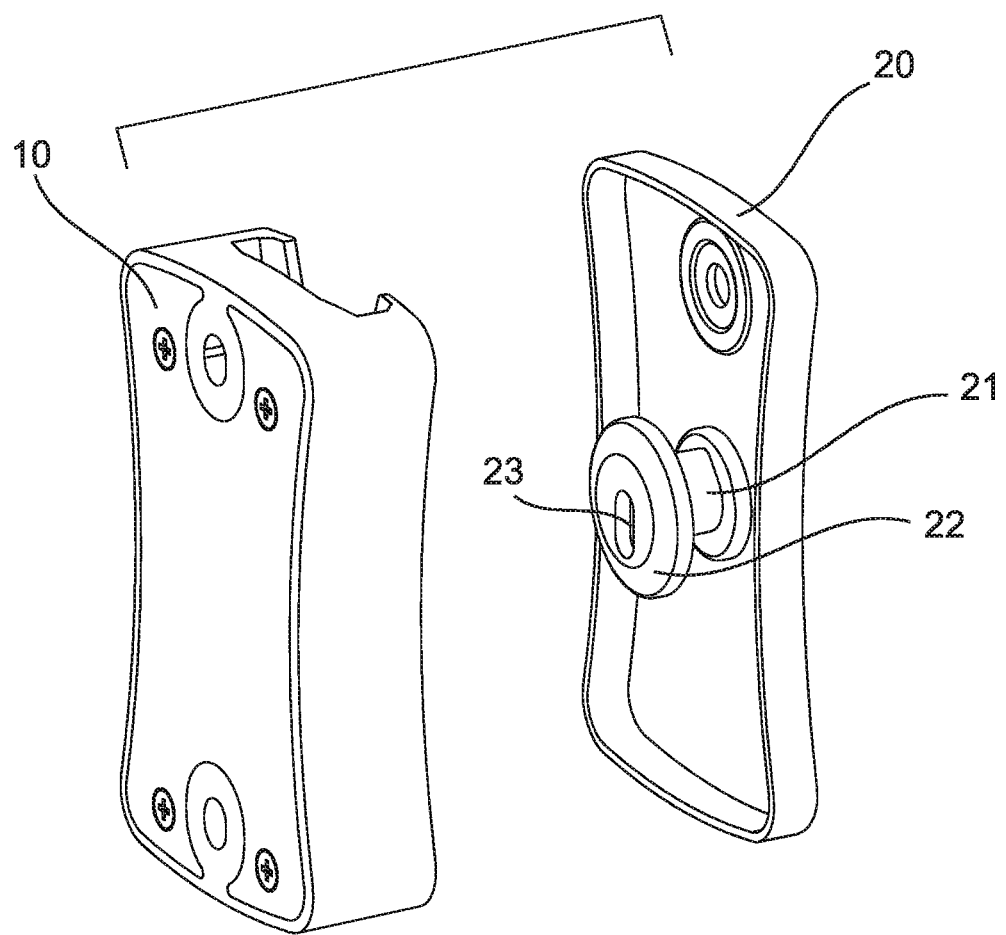
FIG. 2 depicts the first body (10) and the second body and their elements.
Figures 3, 4:
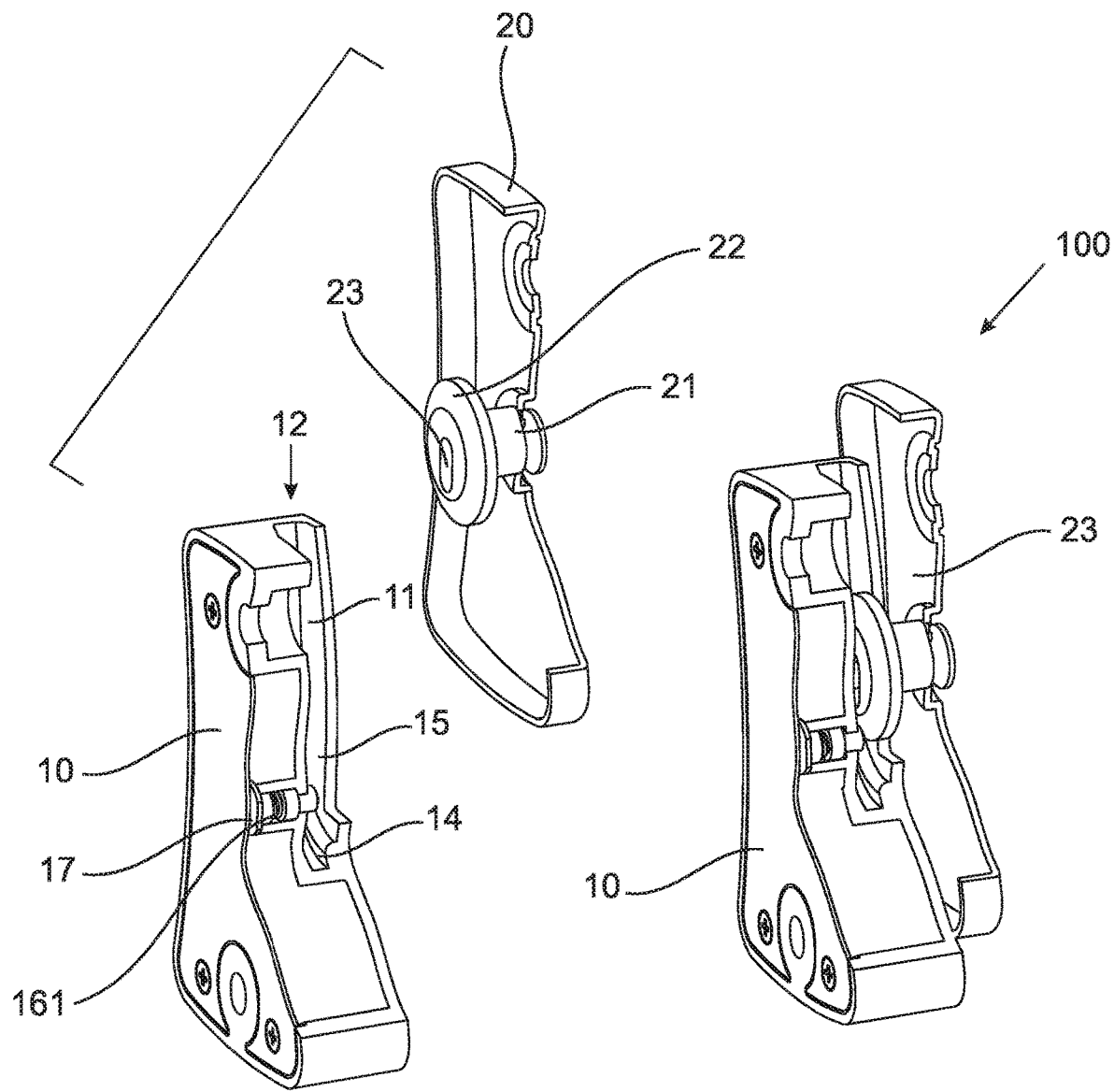
FIG. 3 depicts a cross section view of the first body (10) and the second body.
FIG. 4 depicts a cross section view of the first body (10) and the second body (20) after being connected.
Figure 5:
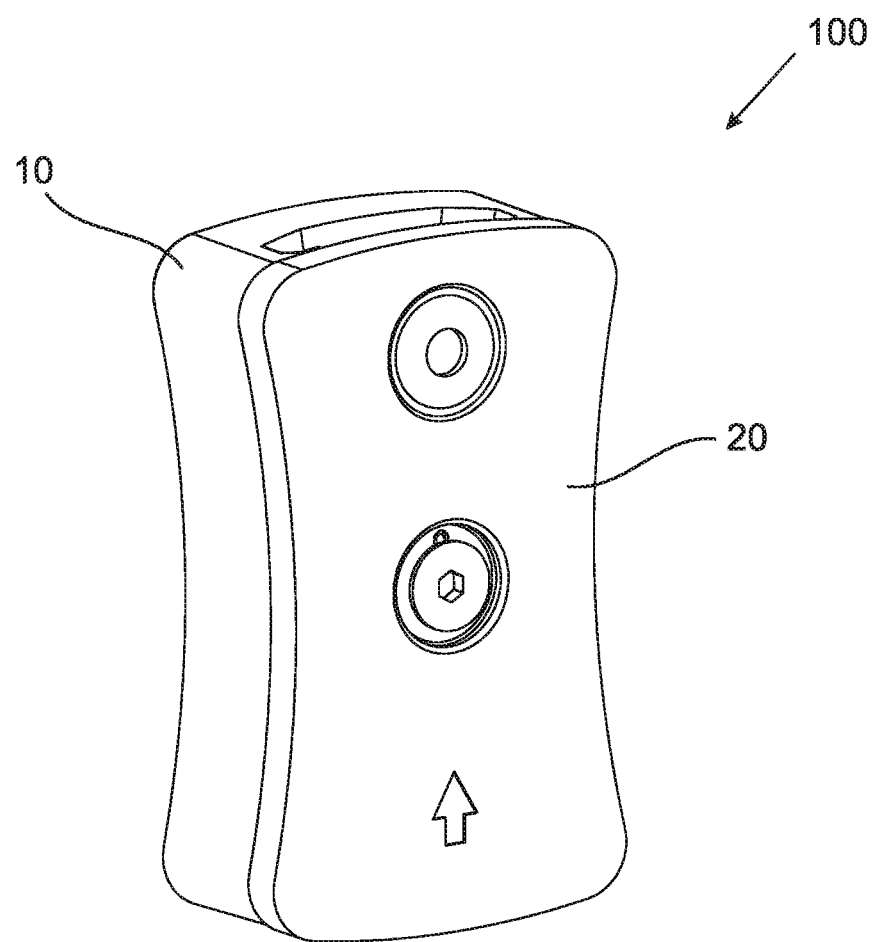
FIG. 5 depicts the television mounting bracket (100).

FIG. 1 depicts the first body (10) and its elements. FIG. 2 depicts the first body (10) and the second body (20) and their elements. FIG. 3 depicts cross section view of the first body (10) and the second body before connecting them together. FIG. 4 depicts cross section view of the first body (10) and the second body (20) after being connected. FIG. 5 depicts the television mounting bracket (100) when the first body and the second body are connected.

In this paragraph we will explain how to install and use the television mounting bracket (100) and how it works and by that to provide better understanding as to the structure of its parts and elements. It is preferable to use two television mounting brackets (100) to hang a television on the wall.

First: connecting the first body (10) to the wall in a way that the vertical slot (13) is facing outside and connecting the second body (20) to the back of the television in a way that the horizontal pin (21) with the locking piece (22) are facing outside. Second: connecting the second body (20) (with the television that is connected to it) to the first body (10) which is already connected to the wall, simply by inserting the locking piece (22) through the top opening (12) into the vertical c-profile channel (11) and accordingly the horizontal pin (21) slides down along the vertical slot (13).

Figure 8:
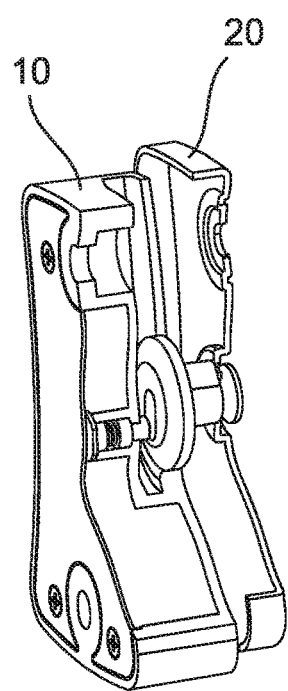
FIGS. 6-10 show the second body (20) and the first body (10) in several states.
Figure 7:
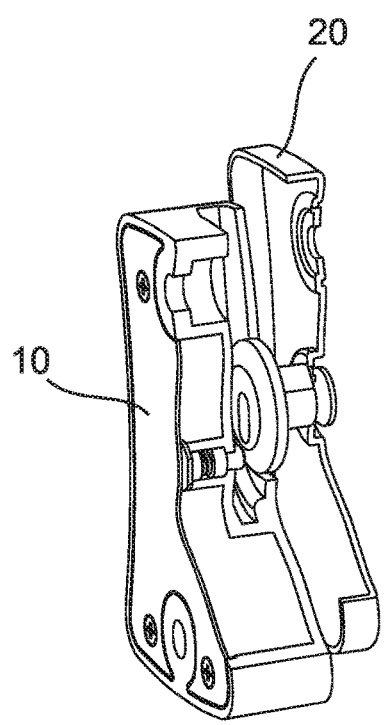
Figure 6:
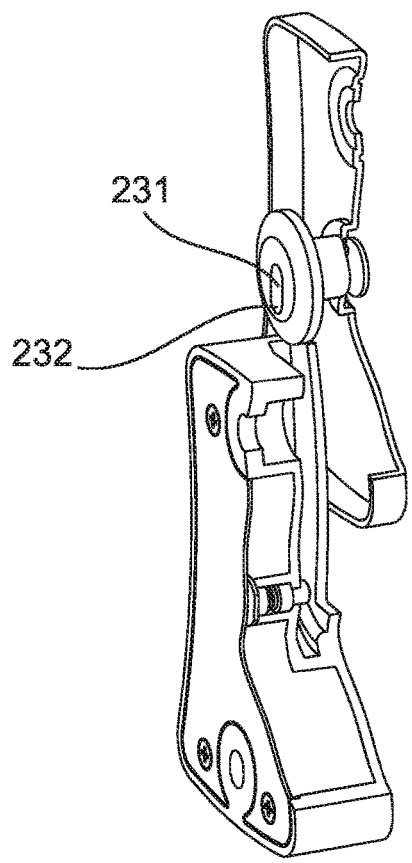

FIG. 6 shows the step of bringing the second body (10) nearby the first body (10) before connecting them together. When the locking piece (22) slides down along the vertical c-profile channel (11), as depicted for example in FIGS. 7 and 8, it repels back the horizontal springy pin (16). Immediately after that, when the locking piece (22) reaches the bottom part (14) of the vertical c-profile channel (11), two things happen: (a) the horizontal springy pin (16) returns to its place and is now in the upper part (231) of the vertical channel (23) as depicted in FIG. 9; and (b) the locking piece (22) is now positioned in the narrow bottom part (14) of the vertical c-profile channel (11) so that it is impossible to move is horizontally (Forward or backward) (hereinafter and in the claims "locked position").

Figures 9, 10:
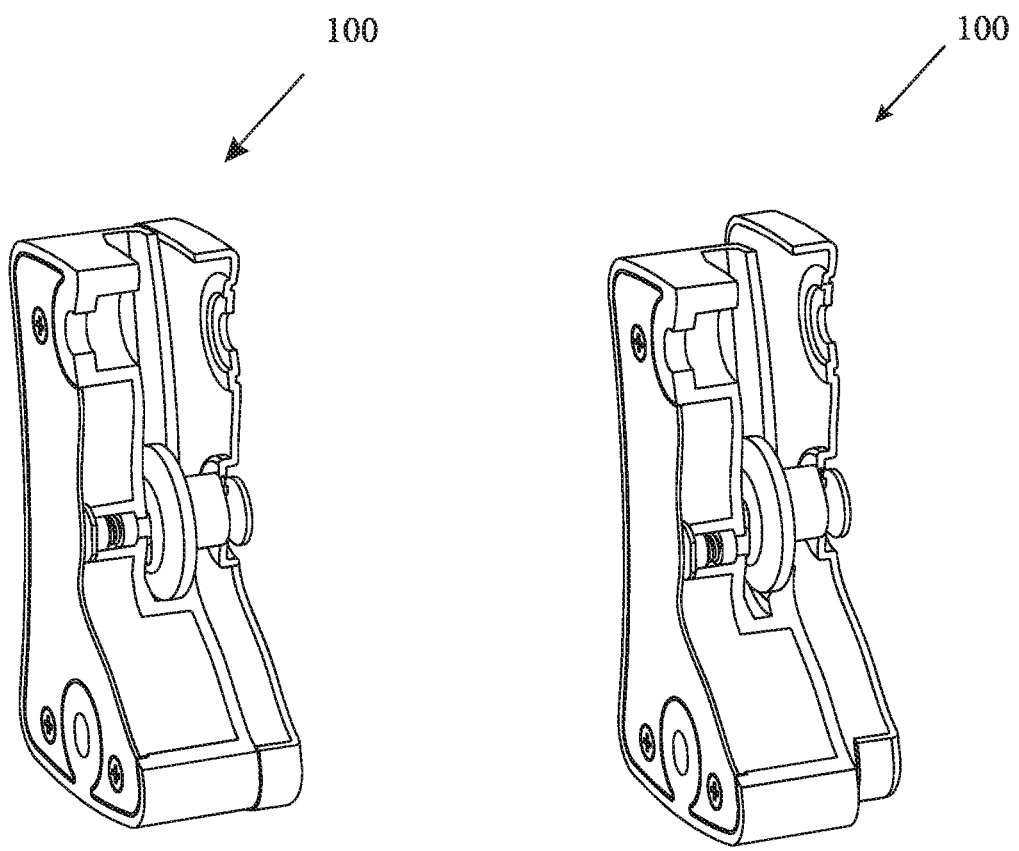

When the television mounting bracket (100) is in the locked position, as depicted in FIG. 9 and explained above, and the user in mistake pushes the television upward, the horizontal springy pin (16) that is inserted in the vertical channel (23) reach now to the bottom part (232) of the vertical channel (23), as depicted in FIG. 10, and prevents the second body (10) from exiting the vertical c-profile channel (11). We use a language whereby the springy pin (16) reach up or down along the vertical channel (23) for convenience reasons only, although in fact is that the vertical channel (23) goes up and down with the locking piece (22) while the springy pin (16) together with the second body (20) and wall are left in place, thank God.

When the user wants to pull out the second body 20 from the first body 10 (to remove the television from the wall) he or she should simply lift the second body 20 slightly to the position where the springy pin 16 is positioned at the bottom part 232 of the vertical channel 23 (FIG. 10) and in this state the locking piece 22 is no longer in the narrow bottom part 14 of the vertical c-profile channel 11 but in its wider part (15W). Then the user can simply pull back the second body 20 to the state where the springy pin 16 is no longer inside the vertical channel 23 of the locking piece 22, and then the second body 20 can be removed from the first body 10, means to remove the TV from the wall.

Figure 11:
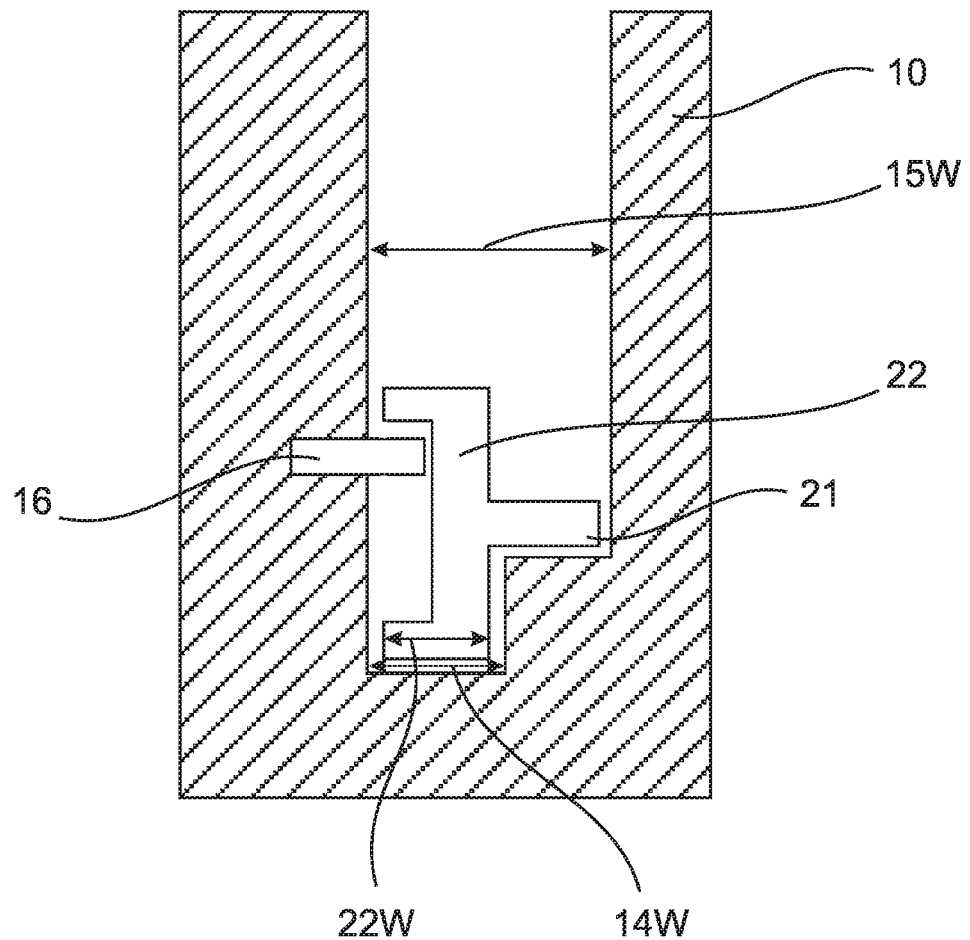
FIGS. 11-13 depict schematically dimensions and proportions of elements of the television mounting bracket (100).
Figure 12:
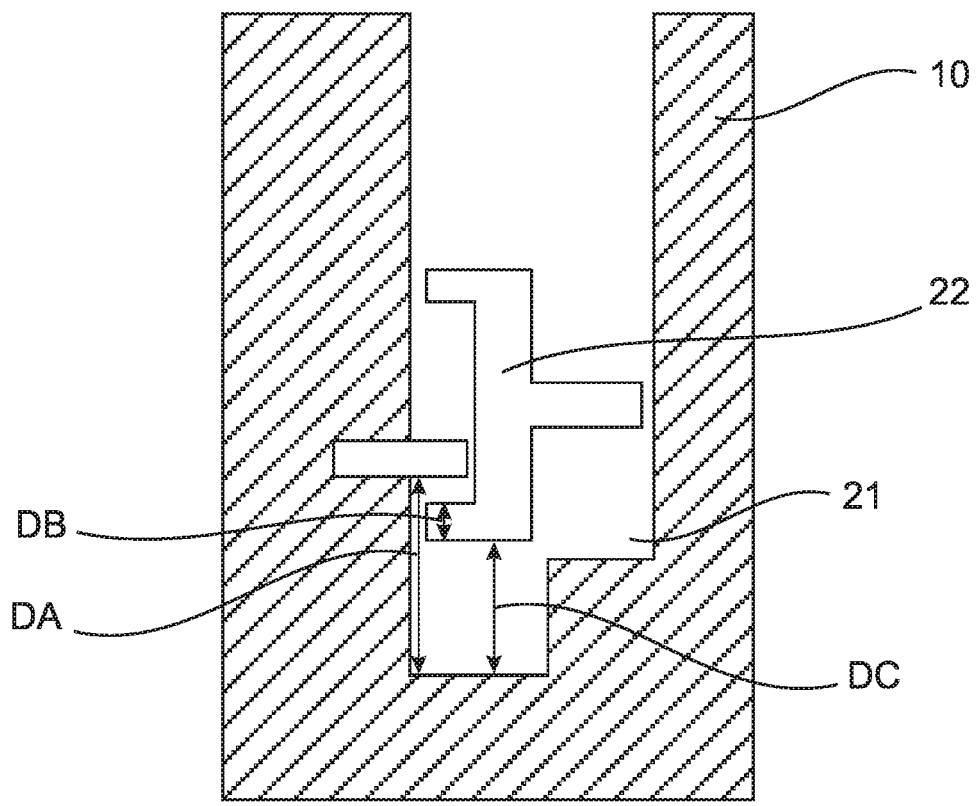
Figure 13:
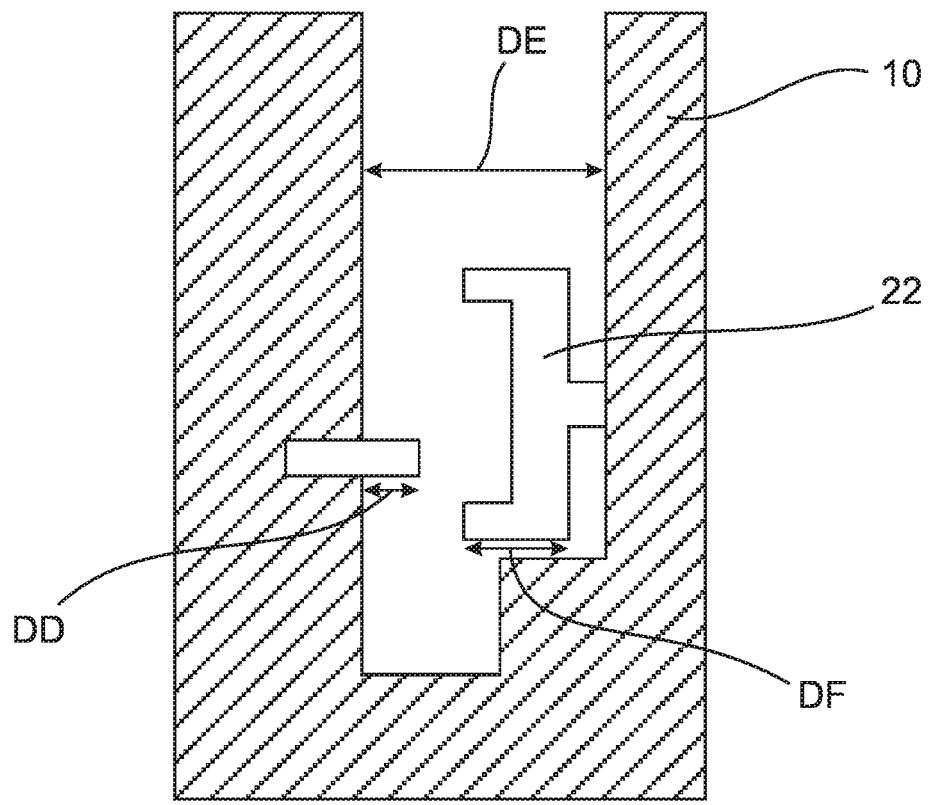
Figure 14:
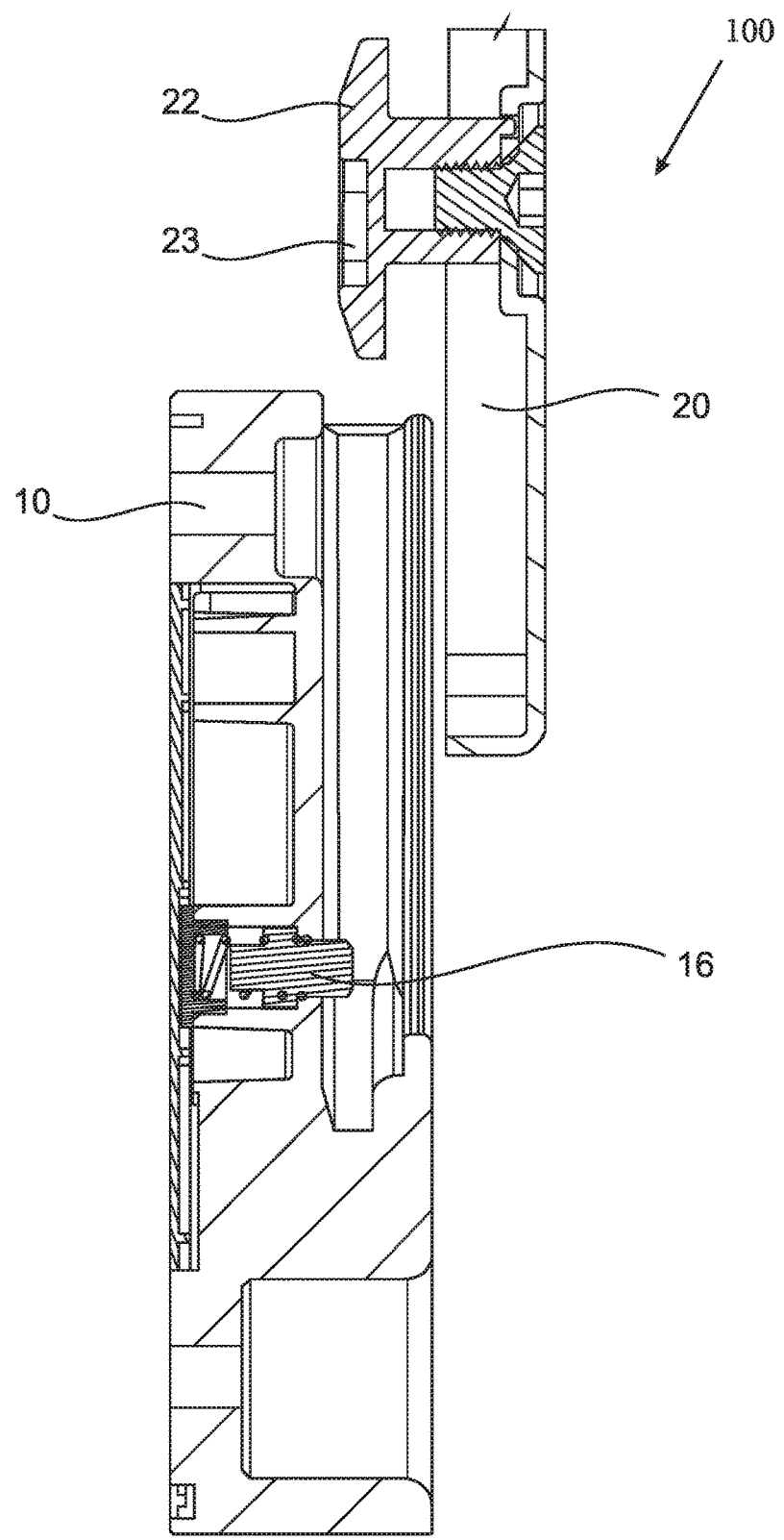
FIGS. 14-19 depict cross section views of several positions of the first body (10) together with the second body (20).
Figure 15:
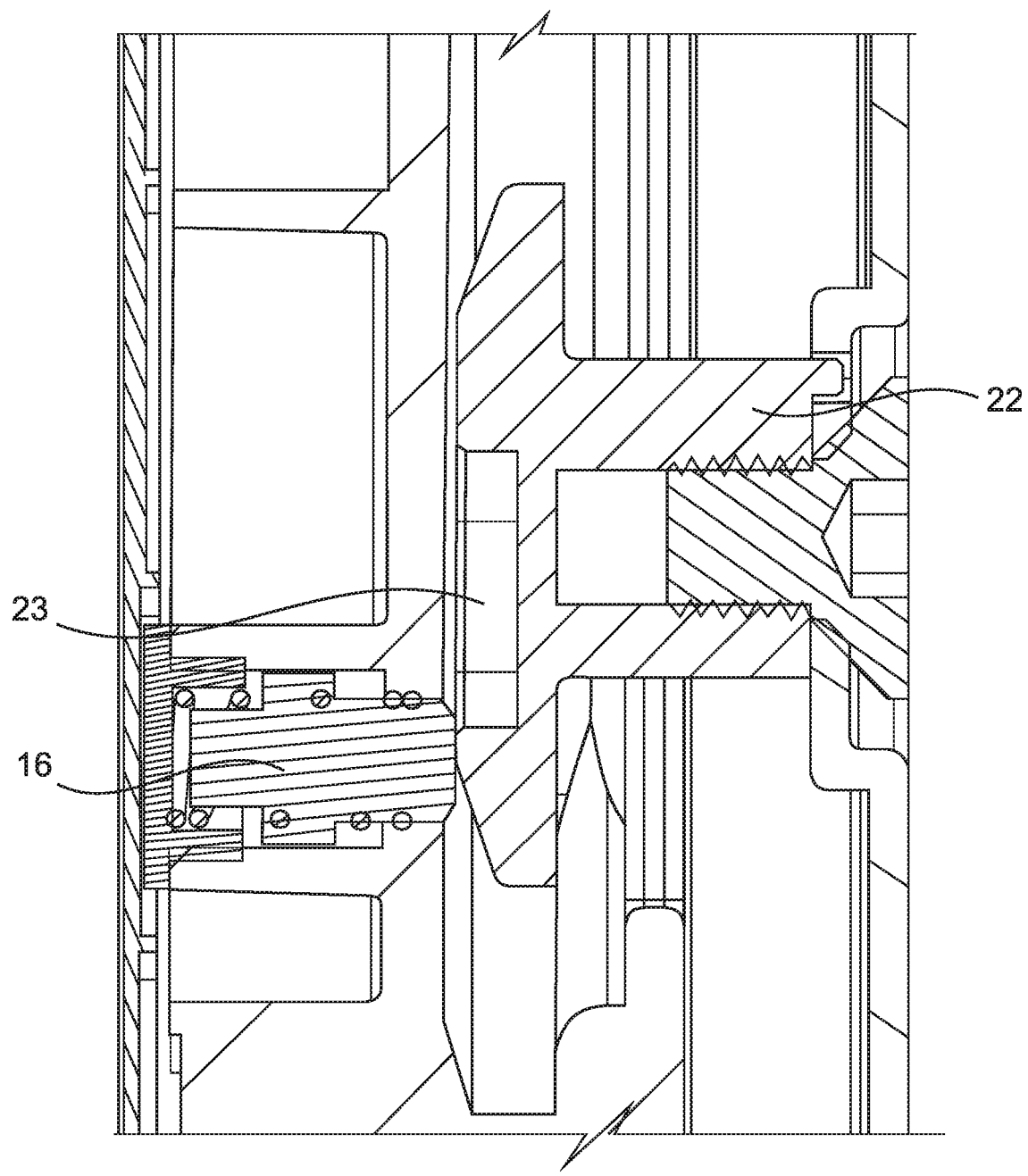
Figure 16:
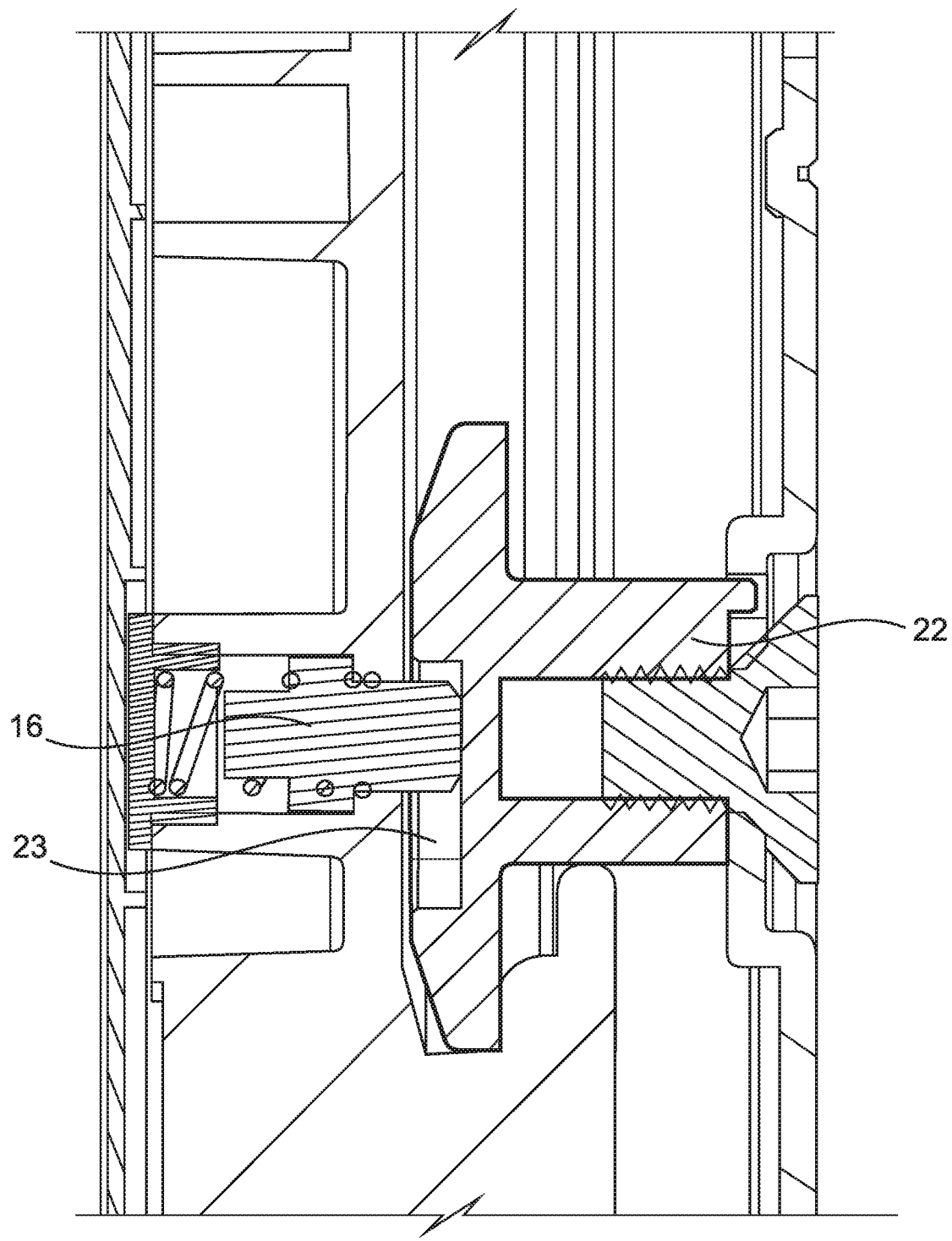
Figure 17:
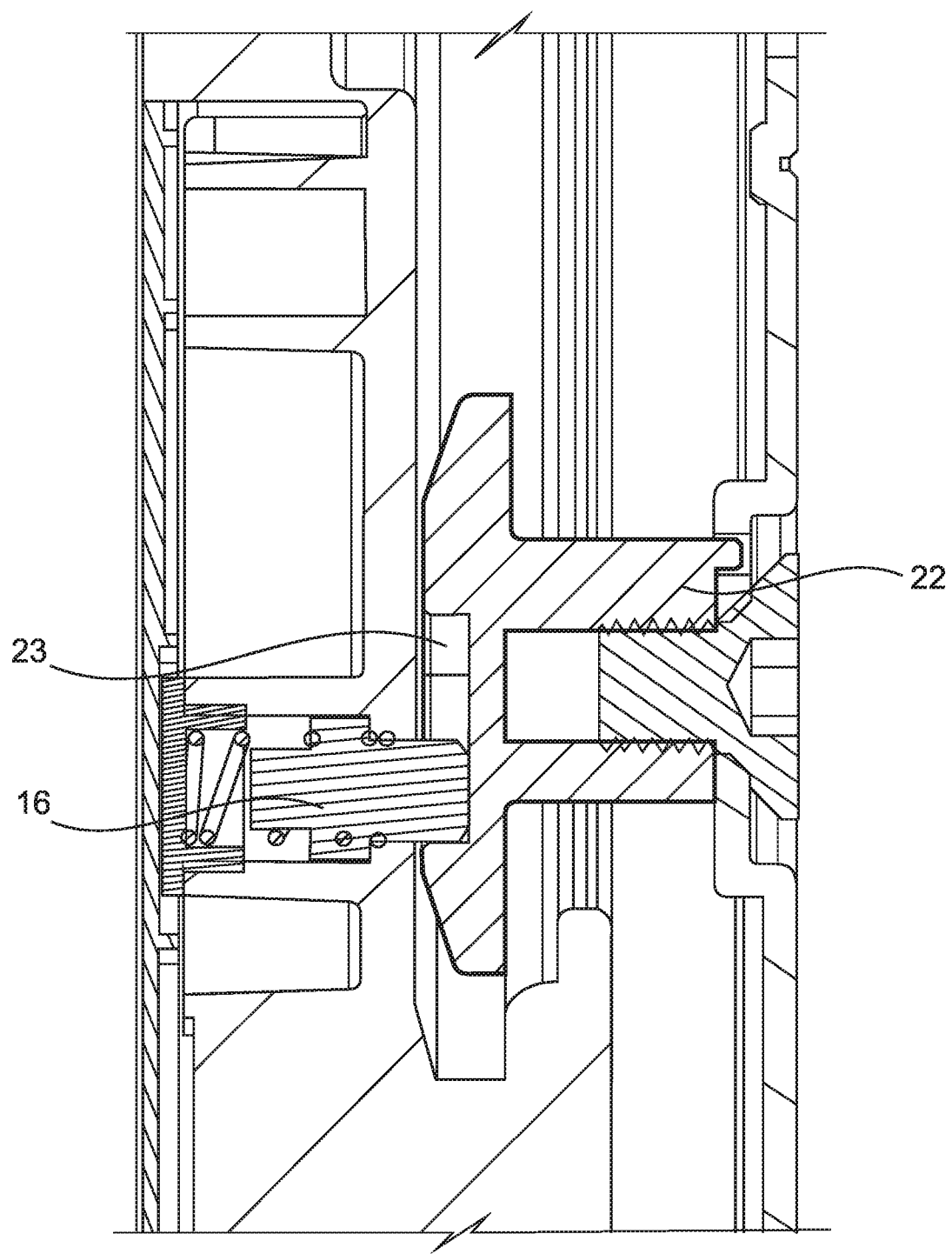
Figure 18:
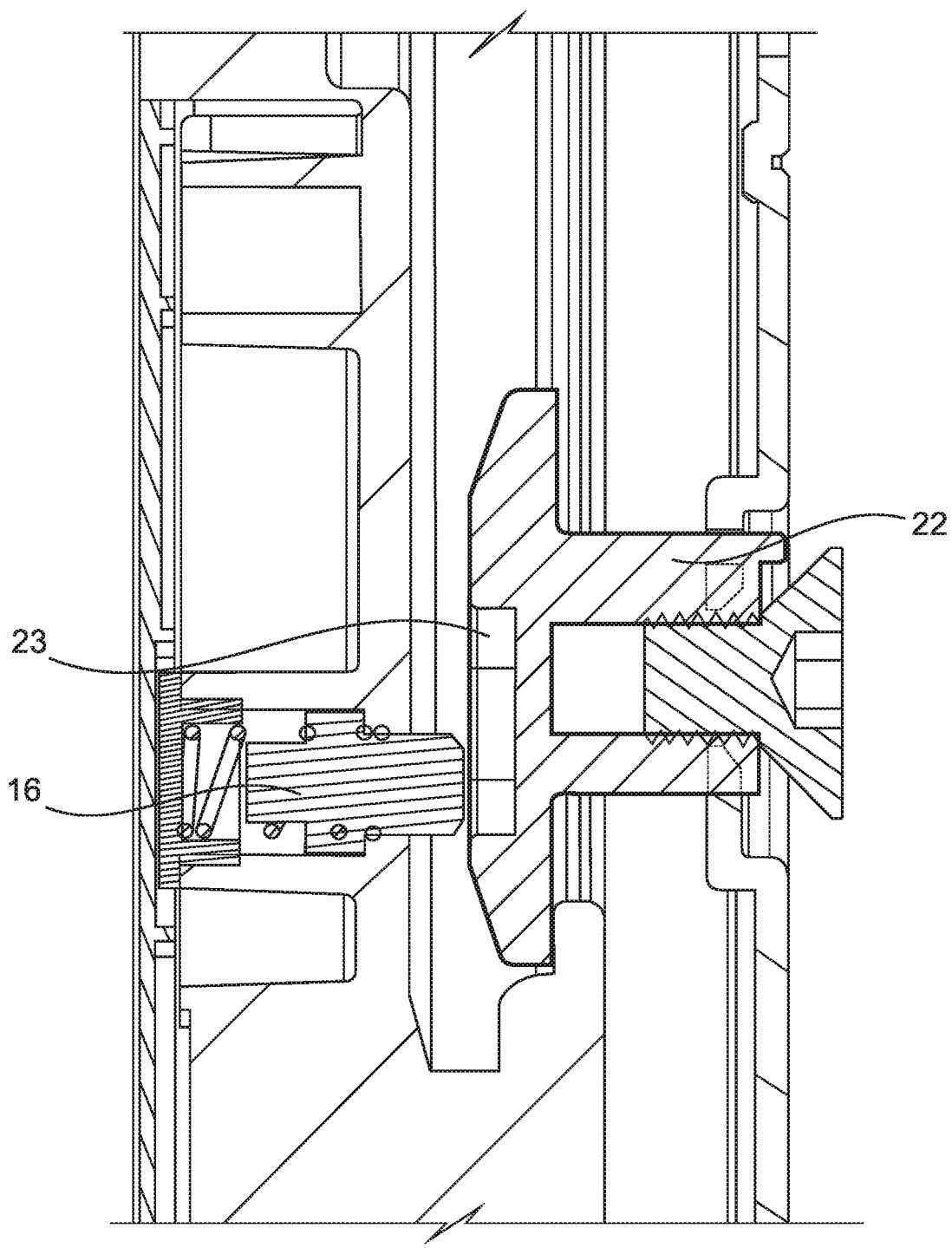
Figure 19:
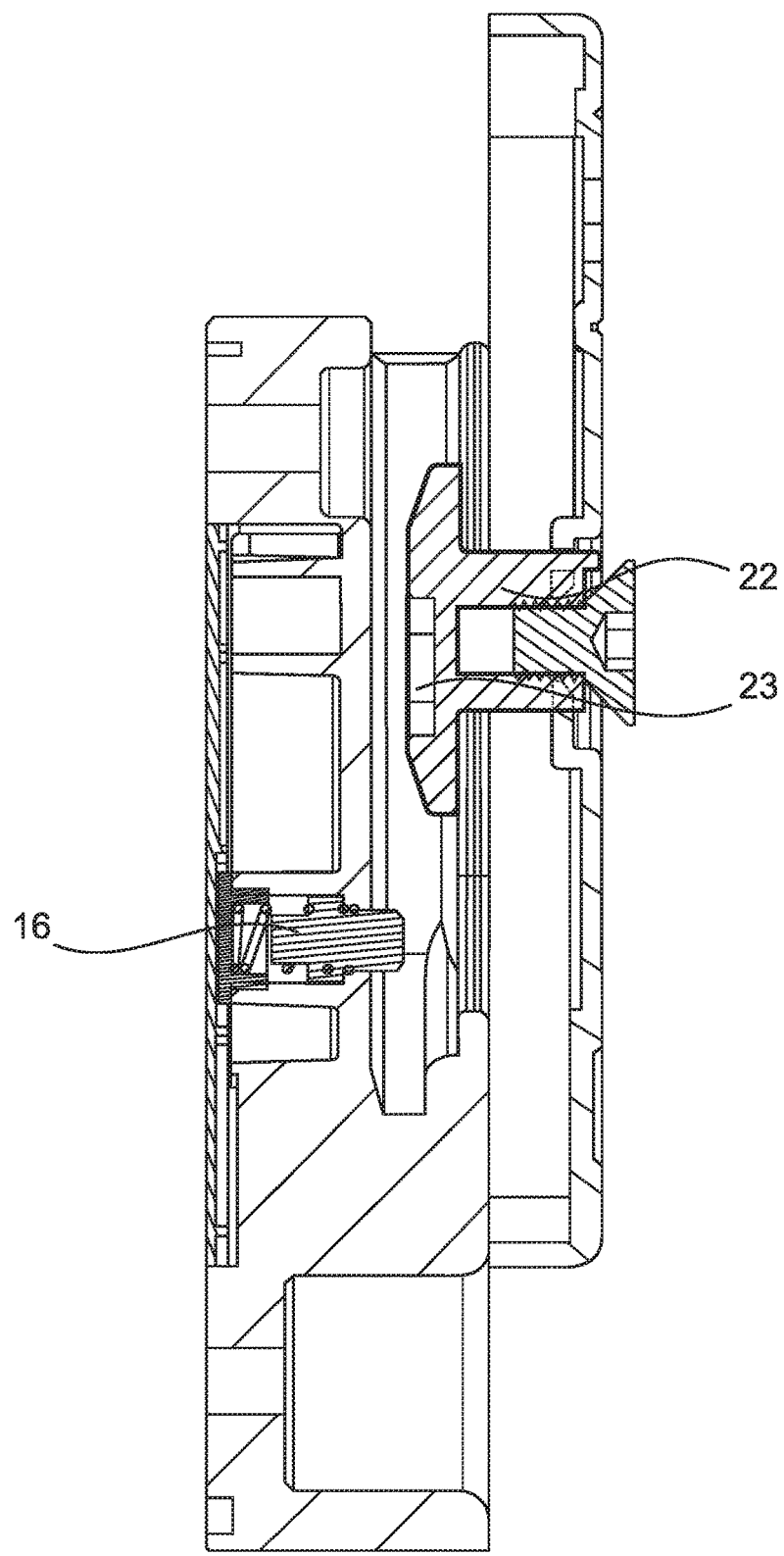

It is understood from the above explanations and from the attached drawings, that it is important that the dimensions and proportions of the narrow bottom part 14, the springy pin 16, the locking piece 22 and the vertical channel 23 be matched and compatible. FIGS. 11-13 depict schematically these dimensions and proportions as follows: (a) The width (22*w*) of the locking piece (22) should match the width (14*w*) of the narrow bottom part (14), so that the locking piece (22) cannot move forward or backward in this position, as depicted in FIG. 11; (b) Distance A (DA) is greater than Distance B (DB) plus Distance C (DC), means, DA>DB+DC, as described in FIG. 12; (c) Distance E (DE) is greater than Distance D (DD) plus Distance F (DF), means, DE>DD+DF, as described in FIG. 13.

FIGS. 14-19 depict cross section views of several positions of the first body (10) together with the second body (20).

What is claimed is:

1. A television mounting bracket for hanging a television on a wall, comprising a first body that is designed to be connected to the wall and a second body that is designed to be connected to the television;

wherein the first body has a vertical c-profile channel that has a top opening and a vertical slot; wherein a bottom part of the vertical c-profile channel is narrower than the rest of the vertical c-profile channel; wherein the first body has a horizontal springy pin that protrudes from a back part of the first body into the vertical c-profile channel; wherein the springy pin is connected to the back part of the first body with a spring in a way that enable to repel the springy pin backward and it returns forward by force of the spring;

wherein the second body has a horizontal pin that is ended with a locking piece that includes a vertical channel; and wherein said locking piece corresponds with the vertical slot and said vertical channel corresponds with the horizontal springy pin.

* * * * *